Dec. 29, 1964 P. AUTIO 3,162,874
ASSEMBLY MACHINE
Filed Nov. 28, 1960 3 Sheets-Sheet 1

INVENTOR.
Paul Autio
BY Olson & Trexler
attys.

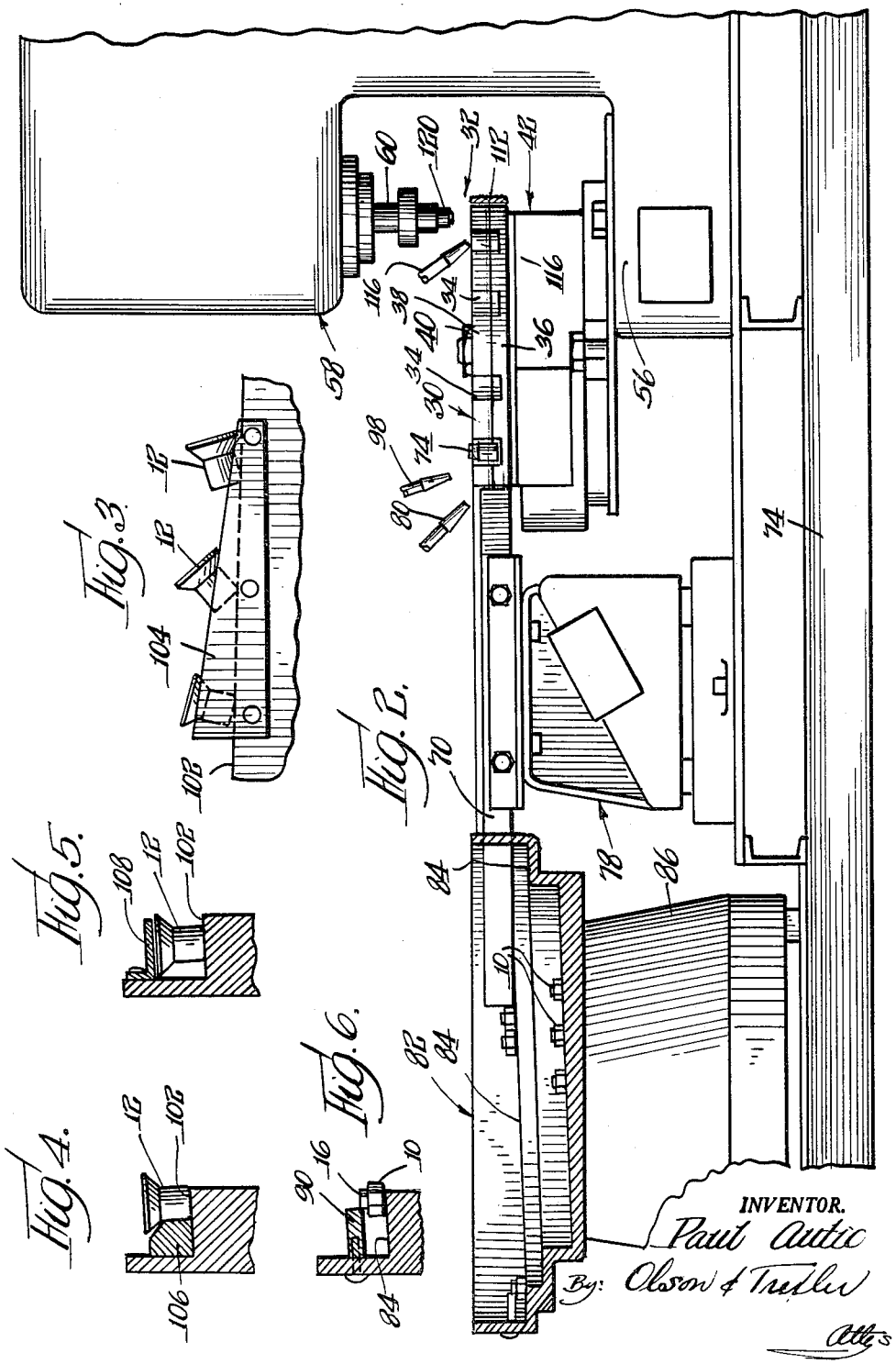

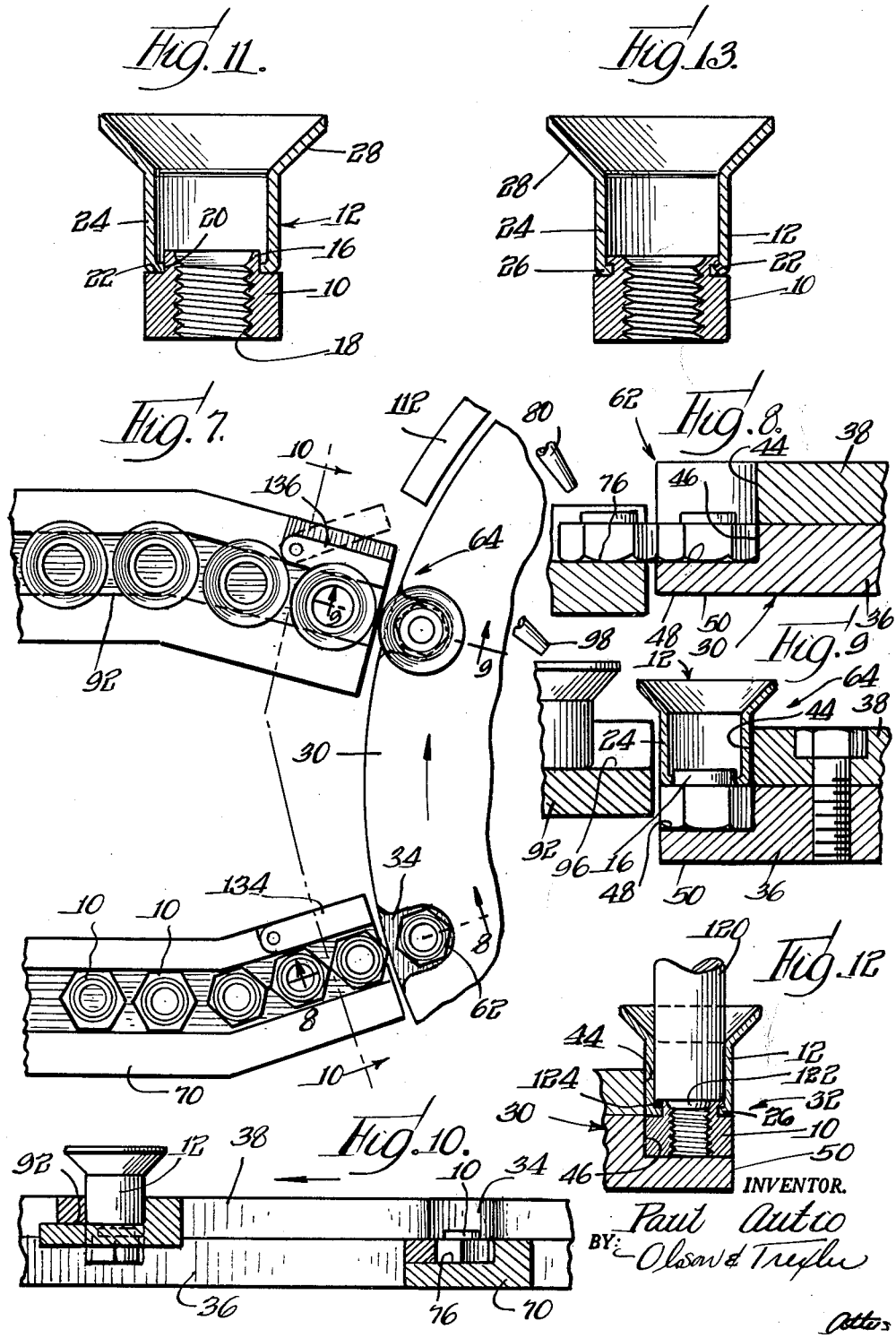

United States Patent Office 3,162,874
Patented Dec. 29, 1964

3,162,874
ASSEMBLY MACHINE
Paul Autio, Elgin, Ill., assignor to Illinois Tool
Works Inc., a corporation of Delaware
Filed Nov. 28, 1960, Ser. No. 72,207
2 Claims. (Cl. 10—155)

The present invention relates to a machine for automatically assembling nuts and coacting small parts together to form permanently assembled units each consisting of a nut and a coacting part having a coaxial, washer-like relationship to the nut.

One object of the invention is to provide a new and improved assembly machine of the above character which will operate automatically with great efficiency and dependability to effect a substantially unfailing assembly and fixing together, in coaxial relation to each other, of nuts and coacting small parts which may have an extensive axial length in relation to the nuts.

Another object is to provide a machine which rapidly and efficiently effects an automatic assembly and fixing together of washers and coacting elements into preassembled units in which the nuts and coacting elements have a nut and washer relationship to each other.

Another object is to provide a nut and coacting element assembly machine of the character recited in the previous objects which has an improved and highly simplified construction that provides an extremely efficient and rapid mode of operation of the machine while at the same time significantly minimizing the manufacturing cost of the machine.

A further object is to provide an assembly machine as recited in the preceding objects which is inherently adapted to be easily and rapidly set up to assemble together nuts and coacting elements of different sizes.

Another object is to provide an improved washer and coacting element assembly machine of the above character which provides for assembling units of nuts and coacting elements at a high production rate while at the same time providing assurance against the faulty assembly of units due to dislodgement of the elements being assembled from their normal positions within the assembly machine.

Other objects and advantages will become apparent from the following description of the exemplary embodiment of the invention illustrated in the drawings, in which:

FIG. 2 is a partially sectioned side view of the assembly machine of FIG. 1;

FIG. 3 is a fragmentary sectional view of the washer supply hopper structure taken with reference to the line 3—3 of FIG. 1;

FIG. 4 is a fragmentary sectional view of the washer supply hopper structure taken with reference to the line 4—4 of FIG. 1;

FIG. 5 is a fragmentary sectional view of the washer supply hopper taken with reference to the line 5—5 of FIG. 1;

FIG. 6 is a fragmentary sectional view of the nut supply hopper structure taken with reference to the line 6—6 of FIG. 1;

FIG. 7 is a fragmentary plan view on an enlarged scale depicting the relationship of the outlet ends of the nut and washer element supply tracks to rotating dial structure of the machine;

FIG. 8 is a fragmentary sectional view taken along the line 8—8 of FIG. 7;

FIG. 9 is a fragmentary sectional view taken with reference to the line 9—9 of FIG. 7;

FIG. 10 is a fragmentary sectional view taken with reference to the line 10—10 of FIG. 7;

FIG. 11 is a vertical sectional view of a nut and washer stacked together before being fixed together by staking;

FIG. 12 is a fragmentary sectional view taken with reference to the line 12—12 of FIG. 1 and illustrating the staking of a stacked nut and washer element; and FIG. 13 is a sectional view similar to FIG. 11 but showing the stacked nut and washer element staked together.

Figure 1:
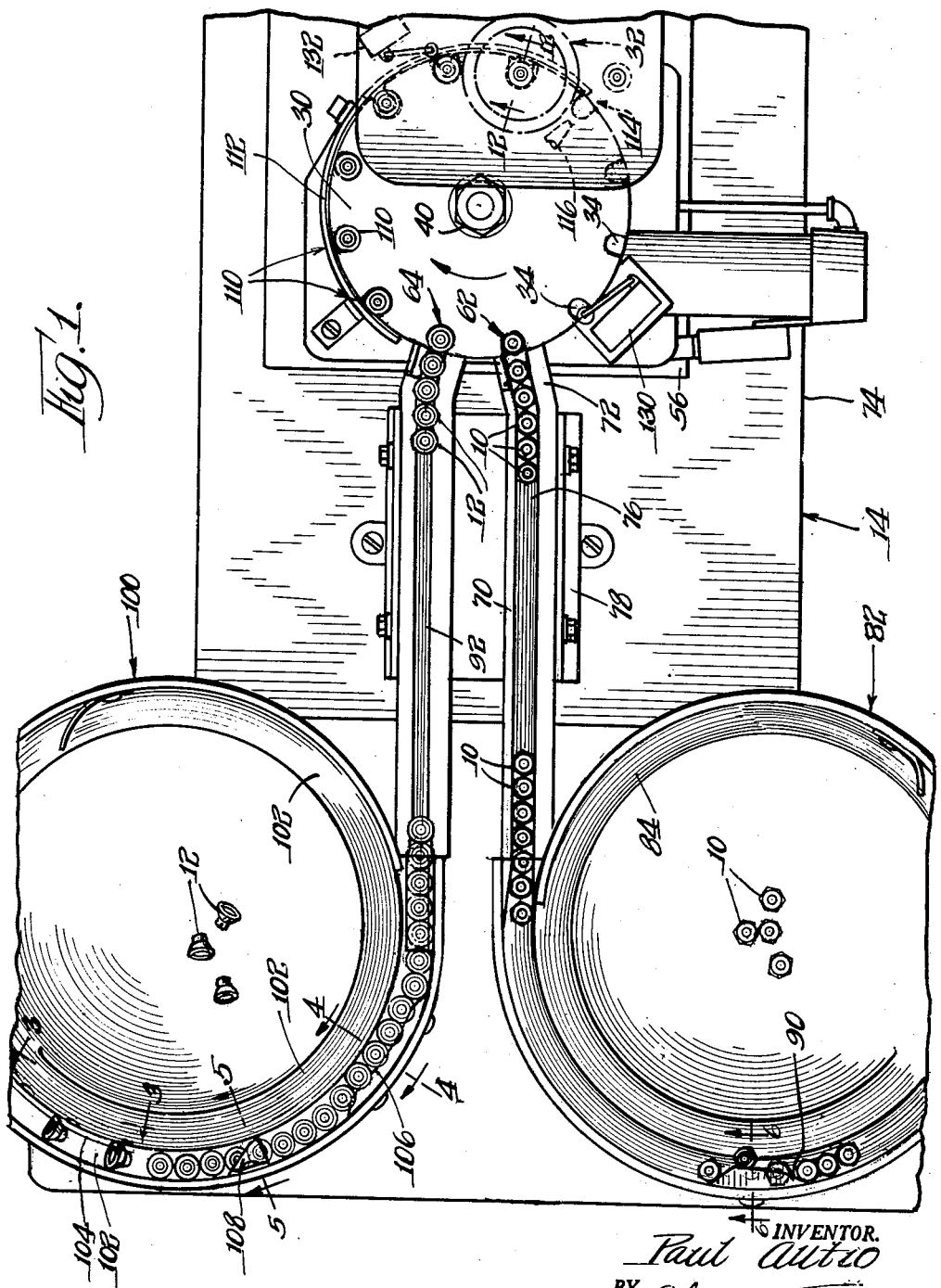
FIGURE 1 is a plan view of an automatic assembly machine forming the illustrated embodiment of the invention.

As previously intimated, the nuts and coacting elements which are assembled together by the assembly machine provided by the invention form assembled units in which the elements assembled to the individual nuts have a concentric washer-like relationship to the nuts. The expression "washer-like relationship" will be used in the application to denote a coaxial abutting relationship of each nut and its coacting element. Moreover, as will presently appear, the assembling machine provided by the invention is well adapted to assemble together nuts and coacting elements which may be shaped to have an extensive axial elongation or extent in relation to the diameter of the elements and in relation to the form and size of the nuts. For simplicity in description, these coacting elements, even though shaped to have an extensive axial length, will be referred to normally as "washer elements."

Typical nuts 10 and washer elements 12, which are assembled and fixed together in coaxial abutting relation to each other in the automatic machine 14, provided by the invention, are illustrated in FIGS. 11 and 13. As supplied for assembly in the machine 14, each nut 10 is formed to define on one end of the nut a short cylindrical retaining flange 16 encircling the threaded internal bore 18 of the nut, and having an external diameter which is sharply reduced in relation to the over-all diameter of the nut. The retaining flange 16 thus formed integrally with the nut 10 in coaxial relation to the threaded bore 18 is designed to fit into a central aperture 20 of the coacting washer element 12, as illustrated in FIG. 11.

The washer element 12, upon being assembled with the nut 10, abuts against an annular shoulder 22 formed on the nut at the base of the retaining collar 16.

The threaded bore 18 in the nut 10 continues through the circular flange 16 and is somewhat enlarged at the projecting end of the flange to facilitate swaging of the projecting end of the collar radially outward, in a manner to be described, to permanently retain the washer element 12 in its assembled relation to the nut.

Before describing the construction of the improved machine 14 which assembles and fixes the nuts and washer elements in coaxial relation to each other, it is helpful to refer briefly to the particular construction of the washer elements 12 illustrated in FIGS. 11 and 13, as these exemplify washer elements of a character which presents special problems in assembly which have not been met satisfactorily by conventional nut and washer assembly machines.

The particular washer elements 12 illustrated in FIGS. 11 and 13 are designed to form seats or retaining elements for springs (not shown) which are subsequently mounted in coaxial abutting relation to these elements, which for present purposes are referred to as "washer elements." As shown, each spring retaining member or washer element 12 comprises an axially elongated cylindrical body portion 24 having an outer diameter aproximating the outer average diameter of the hexagon shaped nut 10. A flange 26, FIG. 13, formed on one end of the cylindrical body 24 is turned radially inward to define the previously mentioned aperture 20 and to fit against the nut shoulder 22. The opposite end of the cylindrical body element 24 merges with an outwardly flared skirt portion 28 having a truncated conical shape, as shown. The exemplary washer elements 12 shown for purposes of illustration have an axial length greatly exceeding either the length or diameter of the nut 10 and approaching the maximum diameter of the washer skirt 28, which is much larger than the cylindrical body 24 of the washer elements. The significance of this is that the axial elongation and shaping of the washer elements 12 creates difficulties, as previously intimated, in assembling the washer elements and nuts together.

In the improved machine 14, the washer elements 12 and nuts 10 are assembled together in a single horizontal dial 30, which rotates about a vertical axis to move the assembled washer and nut elements into a swaging or staking station 32, FIGS. 1, 2 and 12, where the assembled units are permanently staked together, as will be described presently in greater detail.

The periphery of the dial 30 is shaped to define a series of circumferentially spaced receivers 34 which open radially outward to receive the nut and washer elements which are to be assembled together. Preferably, the dial 30 is formed by two flat circular discs 36, 38 which are secured together in concentric relation to each other and held by nut means 40 against an underlying rotary support means 42.

Each nut and washer element assembly receiver 34 is defined by a U-shaped recess 44 formed in the upper dial disc 38, and a similarly shaped recess 46 is formed in the lower dial disc 36 in underlying alined relation to the recess 44. The recesses 44 and 46 in both dial plates 36 and 38 open radially outward to the extreme peripheral edge of the dial. The recess 44 in the upper disc 38 extends all the way between the upper and lower faces of this disc. But the recess 46 in the lower disc 38 extends downwardly only part way through the thickness of this disc, and defines a flat nut support bottom surface 48 which is underlaid by thick nut supporting structure 50 of the disc 36.

The receivers 34 thus formed by the disc recesses 44 and 46 are dimensioned radially and transversely to provide just sufficient space to accommodate the diametrical dimensions of the nuts and the cylindrical bodies of the washer elements to be assembled. The receivers 34 have sufficient depth to accommodate the length of the nuts 10 and the major portion of the length of the cylindrical bodies 24 of the washer elements 12. As will presently appear, the enlarged skirts on the washer elements 12 project above the top of the dial 30.

The dial 30 is intermittently indexed rotatably through angles equal to the radial angle by which the receivers 34 are rotatably spaced from each other. This indexing of the dial 30 is effected by the previously mentioned rotary support means 42. The means 42 which supports and indexes the dial 30 is of a conventional construction and can be readily obtained from commercial sources.

Preferably, the dial support means 42 is mounted on the base 56 of a hydraulic press 58 which includes a downwardly projecting plunger 60 overlying the previously mentioned swaging station 32.

Indexing of the dial 30 brings the individual receivers 34 into successive alinement with a nut loading station 62 and a washer element loading station 64 circumferentially spaced around the dial from the swaging station 32, as illustrated in FIG. 1.

A procession of properly oriented nuts 10 is supplied to the nut loading station 62 through a generally horizontal path which has an outlet end portion of substantial length extending to the nut loading station along a radial line from the axis of the dial. The path along which the procession of nuts 10 is progressed is defined by an upwardly open channel shaped support rail 70. It will be noted that an end portion 72 of the track 70 having substantial length and located adjacent the dial 30 is turned to extend toward the dial along a radial line from the axis of the dial. The remaining portion of the track 70 is turned at a slight angle to the portion 72, better to fit the machine onto its support base 74. The nut supporting surface 76 in the rail or channel 70 is substantially flush with the bottom surface 48 of the receiver 34 positioned in the nut loading station 62, as shown in FIG. 8.

A procession of nuts 10 is caused to progress along the channel 70 toward the dial 30 by a horizontal vibratory motion imparted to the channel by vibratory support means 78 for the channel. The vibratory support means 78, itself, is of a conventional construction and is readily available from commercial sources. As shown in FIGS. 1 and 2, the vibratory support structure 78 is mounted on the machine base 74 in underlying supporting relation to the channel 70.

Upon movement of a receiver 34 into the nut loading station 62, the nut 10 at the outlet end of the channel 70 is moved into the receiver, as illustrated in FIG. 8, by the tendency of the vibrating means 78 to urge the nut toward the dial, and by a soft air jet directed toward the nut at the outlet end of the channel 70 from an air nozzle 80. In this manner, the receiver 34 in the nut loading station is quickly loaded with a nut which occupies the receiver space so as to block entry of the next successive nut.

The nuts 10 progressed along the channel 70 and admitted to the receiver 34 are oriented so that the retaining flanges 16 project upwardly.

A continuous succession of properly oriented nuts is supplied to the end of the channel 70 opposite from the dial 30 by a vibratory supply hopper 82. Generally circular in form as viewed from above, the hopper 82 is vibrated with an oscillatory motion to cause nuts 10 in the hopper to progress upwardly along an inclined spiral path 84 defined in the circular sidewall of the hopper. The desired vibratory motion is applied to the hopper 82 by vibratory support means 86 mounted on the machine base 74, as shown in FIG. 2. The hopper vibrating structure, itself, is of a conventional construction available from commercial sources.

As nuts 10 progress upwardly along the spiral path 84, they pass alongside a discriminating element 90 which is designed to allow only those nuts to pass which are oriented so that the flanges 16 on the nuts project upwardly. Those nuts which are inverted from their desired position are displaced laterally by the discriminating element 90 to fall from the path 84 back down into the hopper.

Upon indexing of the dial 30, the receiver loaded with a nut in the station 62 is carried to the station 64 where the receiver is alined with the outlet end of a horizontal washer element supply track or channel 92. The main portion of the washer element supply channel 92 is parallel to the nut supply channel 70. At the dial end of the channel 92 this channel is turned toward the axis of the dial to extend to the station 64 along a radial line from the axis of the dial.

A procession of washer elements 12 is supplied to the channel 92 by means to be described which orients the washer elements so that the enlarged ends of the washer elements project upwardly. The channel 92, like the channel 70, is supported on the vibrating means 78 which vibrates the channel 92 horizontally to cause the procession of washer elements to progress toward the station 64.

As shown in FIG. 9, the washer element support surface 96 in the channel 92 is positioned at a vertical level substantially flush with the upper ends of the annular flanges 16 on the nuts moved into the station 64.

Upon movement of a receiver 34 into the station 64, the washer element 12 at the outlet end of the channel 92 is quickly moved into the receiver by the action of the vibratory motion which urges the washer elements toward the dial, and by means of a soft air jet played on the washer element at the outlet end of the channel 72 by an air nozzle 98, FIG. 9. This radial movement of a washer element into a receiver 34 causes the lower end of the washer element to slide across the flange 16 of the underlying washer until the washer element reaches a coaxial relation to the nut, whereupon it drops down into encircling relation to the flange 16. The washer element is in this manner seated in assembled relation to a coacting nut, and serves to block entry of the next adjacent washer element into the receiver. It will be noted that the sidewall of the recess 44 and the upper dial disc 38 coact with the cylindrical body portion 24 of the assembled washer element to prevent toppling of the washer element from the underlying nut by the succeeding washer element in the track 92.

A procession of properly oriented washer elements is supplied to the track or channel 92 from a generally circular hopper 100 which is vibrated with an oscillatory motion by underlying vibrating structure similar to the vibrator 86 for the hopper 82. The vibratory motion of the hopper 100 causes washer elements in the hopper to progress upwardly along an inclined spiral path 102. As the washer elements progress up the path 102, they are turned into an upright position with the aid of a wedge shaped orientation cam 104. This element engages the enlarged skirts in the washers to turn them into a desired upright position, as illustrated.

Any washer elements which are inverted from their desired positions are displaced from the path 102 to fall back into the hopper. This is effected by means of a discriminating element 106, FIG. 4, which narrows the path to a width just sufficient to accommodate properly oriented washer elements.

Any washer elements which are stacked together are laterally displaced from the path 102 before reaching the discriminating element 106 by means of a discriminating element 108 overlying the path 102 at a position spaced sufficiently therefrom to provide clearance for single washer elements while at the same time serving to engage and dislodge stacked washer elements from the path. The upper end of the path 102 merges with the inlet end of the channel 92.

In the station 64, the washer elements 12 are assembled in coaxial abutting relation to the nuts 10, to have the positional relationships to each other which are illustrated in FIGS. 9 and 11.

Subsequent indexing of the dial 30 carries the assembled washer and nut units from the station 64 into a succession of idle stations 110 located between the station 64 and the swaging station 32, as shown in FIG. 1. The assembled nut and washer element units being moved from the station 64 to the swaging station 32 are held in the dial 30 against radial dislodgment from the recesses 34 by means of an arcuate retaining ring 112 closely embracing the outer periphery of the dial between the stations 64 and 32, as illustrated in FIG. 1. Preferably, the ring 112 extends somewhat beyond the swaging station 32, to a discharge station 114 where the assembled units, staked together in the station 32 as will be described, are discharged from the receivers 34 with the aid of an air jet from a nozzle 116.

Each assembled nut and washer element unit indexed into the swaging station 32 is firmly supported by the underlying dial structure 50, which is in turn firmly supported by the dial support and actuating structure 42 mounted on the underlying base 56 of the press 58.

The hydraulic press 58 is synchronized with indexing movement of the dial 30 to lower the plunger 60 upon movement of each nut and washer element unit into the station 32. Operation of the press 58 in synchronization with the dial 30 is controlled by suitable synchronizing means which is readily available from commercial sources and requires no detailed description here.

A generally cylindrical swaging tool 120 depending from the lower end of the plunger 60 is moved downwardly by the plunger 60 into the cylindrical body portion 24 of an underlying washer element. A circular swaging protuberance 122 of reduced diameter formed on the lower end of the swaging element 120 enters the internally flared upper end of the underlying nut flange 16 to swage the upper periphery of this flange radially outward, where it is engaged by an annular swaging shoulder 124 on the element 120. The shoulder 124 firmly crimps or stakes the outwardly flared flange against the inwardly turned flange 26 on the washer element, to effect a secure retention of the nut and washer element in assembled relation to each other.

The swaging element 120 is retracted and the assembled nut and washer element indexed to the discharge station 114 where the assembled unit is discharged from its receiver 34 by an air jet from the nozzle 116, as described.

In the extremely unlikely event that a washer and nut element were not removed from the coating receiver in the discharge station 114, the continued presence of these elements, or either one of them, in the receiver would be detected by a sensing switch 130 positioned alongside the periphery of the dial 30 between the station 114 and the nut loading station 62. Upon sensing that the adjacent receiver 34 is not empty, the switch 130 operates to stop the machine before a jam-up can occur.

In the unlikely event that a nut in the outlet end of the nut supply channel 70 should become jammed against structure which rotates with the dial 30, the nut is released, by opening of a spring biased swingable gate 134, FIG. 7, defining the side of the outlet end of the channel 70 located downwardly from the adjacent nuts in the direction of table movement. Similarly, a spring biased swingable gate 136, forming one side of the outlet end of the washer element supply channel 92 will open under pressure to release any washer elements which should, for any reason, become jammed against structure rotating with the dial 30.

The nut and washer element assembling machine thus formed will operate with great efficiency to effect assembly of nuts and washer elements at a very high production rate. Moreover, this high production rate is achieved while, at the same time, providing a substantially unfailing assembly of coacting nut and washer elements in properly assembled relation to each other.

This reliability is achieved even in the assembly of elongated washer elements of the character described which tend to topple from proper positions of orientation for assembly.

It is also noteworthy that the washer elements 12, as assembled with the nuts in the station 64, are retained in their assembled positions on the coacting nuts by the horizontal dial and retaining ring structure while the assembled units move past the sensing switch 132 which checks on the proper assembly of nut and washer elements approaching the swaging station 32.

The utter simplicity of the structure of the dial 30 and the structure of the nut and washer element supply channels 70 and 90 provide for quick replacement of these elements as necessary, to set up the machine for assembling nuts and washer elements of different size and shape. In this connection, it will be appreciated that for assembling nuts and washer elements of any particular size, a dial 30 is used which defines receivers 34 conforming in size to the parts to be assembled.

It will be appreciated that the invention is not necessarily limited to use of the particular construction illustrated, but includes the use of variants and alternatives within the scope of the invention as defined by the claims.

The invention is claimed as follows:

1. In a machine for assembling and fixing together nuts and washer elements, the combination of a single rotary dial defining a plurality of circumferentially spaced receivers having radially outward extremities which open radially outward through the periphery of the dial, nut feeding means extending to a nut loading station into which successive ones of said receivers are moved by rotation of said dial, said nut feeding means including means for physically urging and guiding nuts to move substantially horizontally toward the periphery of said dial at a nut loading level with respect to said dial to move substantially horizontally into successive receivers in said nut loading station through the radially open outer extremities of the receivers, washer element feeding means extending to a washer element loading station into which the receivers are moved in succession by rotation of said dial, said washer element feeding means including means for physically urging and guiding washer elements to move substantially horizontally toward the periphery of said dial at a washer element loading level with respect to said dial which is located above said nut loading level with respect to said dial whereby the washer elements are moved substantially horizontally through the radially open outer extremities of successive receivers into an overlying concentric relation to nuts disposed in receivers in said washer element loading station, swaging means positioned at a fastening station into which said receivers are moved from said washer element loading station successively by rotation of said dial, arcuate retaining means closely embracing the periphery of said dial between said washer element loading station and said fastening station to prevent dislodgment of stacked nuts and washer elements from receivers moving to said fastening station, sensing switch means positioned between said washer element loading station and said fastening station to sense the absence of properly stacked nuts and washer elements in receivers moving to said fastening station, said swaging means operating under the control of said sensing switch and in synchronization with said dial to fasten together stacked nuts and washer elements in successive receivers moved into said fastening station, means defining between said fastening station and said nut loading station an unloading station in which said receivers are unloaded, and a control switch positioned to sense and respond to the presence of nuts or washer elements in receivers moving from said unloading station to said nut loading station.

2. A machine for automatically assembling nuts and coacting washer elements which may be elongated axially, comprising, in combination, a generally horizontal rotary dial defining a series of circumferentially spaced receivers opening radially outward through the adjacent periphery of the dial, a substantially horizontal nut feeding track having an outlet end opening toward the axis of said dial in opposing relation to the periphery of said dial in generally perpendicular relation thereto to discharge nuts into successive receivers rotated into alinement with said track outlet end, a nut supplying hopper defining an upwardly sloping nut supply path, vibrating means coacting with said hopper to effect movement of a procession of nuts along said path, shaped discriminating elements positioned along said path to displace therefrom all nuts not having a predetermined orientation with respect to the path, means for directing a procession of nuts from said hopper path onto said nut feeding track, vibratory means coacting with said track to effect progress of nuts therealong into said receivers, a generally horizontal washer element feeding track having an outlet end opening toward the axis of said dial in opposing relation to the periphery of said dial to discharge washer elements into successive receivers rotated into alinement with said last mentioned track outlet end, a washer element supply hopper defining a rising path, vibratory means actuating said washer element hopper to cause a procession of washer elements to move along said washer element hopper path, discriminating elements positioned along said last mentioned path to displace therefrom all washer elements not having a predetermined orientation with respect to the path, means for directing washer elements from said path onto said washer element feeding track, vibratory means coacting with said washer element feeding track to effect progression of washer elements therealong into successive ones of said receivers, the dial ends of said nut and washer element feeding tracks being differentially positioned vertically with respect to said dial to effect a stacking together of nut and washer elements supplied to said receivers, and nut and washer element fastening means positioned to fix together nuts and washer elements stacked together in said receivers.

References Cited by the Examiner
UNITED STATES PATENTS

| | | | |
|---|---|---|---|
| 1,861,889 | 6/32 | Stoll | 10—155.5 |
| 2,023,561 | 12/35 | Williams et al. | 10—169 |
| 2,464,216 | 3/49 | Devol | 10—164 |
| 2,665,005 | 1/54 | Mundy | 198—33.1 |
| 2,872,019 | 2/59 | Owen | 198—33.1 |
| 2,914,781 | 12/59 | Prutton | 10—155.5 |
| 2,927,333 | 3/60 | Stern | 10—155.5 |
| 2,996,738 | 8/61 | Wilson | 10—155.5 |
| 3,012,651 | 12/61 | Hawkes | 198—33.1 |
| 3,024,523 | 3/62 | Donaldson | 29—211 |
| 3,114,159 | 12/63 | Yoshikawa | 29—208 |

ANDREW R. JUHASZ, *Primary Examiner.*

CARL W. TOMLIN, WILLIAM W. DYER, Jr.,
*Examiners.*

UNITED STATES PATENT OFFICE
CERTIFICATE OF CORRECTION

Patent No. 3,162,874

December 29, 1964

Paul Autio

It is hereby certified that error appears in the above numbered patent requiring correction and that the said Letters Patent should read as corrected below.

Column 6, line 13, for "coating" read -- coacting --; same column 6, after line 20, insert the following paragraph:

As illustrated in FIG. 1, another sensing switch 132 is positioned along the periphery of the dial 30 just ahead of the swaging station 32 to sense the absence of properly assembled nut and washer units in receivers 34 approching the swaging station. In the event a receiver alined with the switch 132 does not contain a properly assembled nut and washer element, the switch 132 operates to block operation of the press 58 when the receiver reaches the swaging station. This prevents the formation of scrap in the swaging station and protects against wedging of improperly assembled parts in the receivers.

Signed and sealed this 22nd day of June 1965.

(SEAL)
Attest:

ERNEST W. SWIDER
Attesting Officer

EDWARD J. BRENNER
Commissioner of Patents